United States Patent
Razzell

(10) Patent No.: US 8,331,424 B2
(45) Date of Patent: Dec. 11, 2012

(54) SERIALIZATION OF MULTI-BAND SEQUENCE KEYING FOR ULTRA WIDEBAND RECEIVER ARCHITECTURE WITH REDUCED COMPLEXITY AND POWER CONSUMPTION

(75) Inventor: Charles Razzell, Pleasanton, CA (US)

(73) Assignee: NXP B.V., Eindhoven (NL)

( * ) Notice: Subject to any disclaimer, the term of this patent is extended or adjusted under 35 U.S.C. 154(b) by 1426 days.

(21) Appl. No.: 10/591,542

(22) PCT Filed: Mar. 2, 2005

(86) PCT No.: PCT/IB2005/050775
§ 371 (c)(1),
(2), (4) Date: Nov. 5, 2007

(87) PCT Pub. No.: WO2005/088851
PCT Pub. Date: Sep. 22, 2005

(65) Prior Publication Data
US 2011/0122929 A1      May 26, 2011

Related U.S. Application Data

(60) Provisional application No. 60/549,850, filed on Mar. 2, 2004.

(51) Int. Cl.
*H04B 1/38* (2006.01)
*H04L 7/00* (2006.01)
(52) U.S. Cl. .................. 375/219; 375/354
(58) Field of Classification Search ............ 375/219, 375/354; 342/387
See application file for complete search history.

(56) References Cited

U.S. PATENT DOCUMENTS

| | | | | |
|---|---|---|---|---|
| 6,049,584 A | * | 4/2000 | Pfeiffer | 378/39 |
| 2002/0089804 A1 | * | 7/2002 | Chea, Jr. | 361/119 |
| 2004/0120424 A1 | * | 6/2004 | Roberts | 375/327 |
| 2004/0166799 A1 | * | 8/2004 | Kral | 455/3.02 |

FOREIGN PATENT DOCUMENTS

WO    WO 2004079938 A2 *  9/2004

OTHER PUBLICATIONS

Askar N K et al: "Spectral Keying/SUP TM/ : A Novel Modulation Scheme for UWB Systems" Ultra Wideband Systems and Technologies 2003 IEEE Conf. on Nov. 16-19, 2003 Piscataway NJ USA; pp. 418-422.
Aiello, G.R. et al.; "Ultra-Wideband Wireless Systems"; IEEE Microwave Magazine, IEEE; Piscataway, NJ, US; vol. 4, No. 2; Jun. 2003 (2003-2006), pp. 36-47.

* cited by examiner

*Primary Examiner* — David C. Payne
*Assistant Examiner* — Brian J Stevens

(57) ABSTRACT

By partially serializing the transmission of a sequence keyed UWB symbol (FIG. 2), the number of parallel receiver branches required to receive such a transmission is reduced. The reduced number of receiver paths are re-used during the reception of each of the partially serialized portions of a UWB symbol, and the local oscillator (312, 332, 334, 336) output frequencies are changed for reception of each of those portions. Reducing the number of parallel receiver paths advantageously reduces the amount of power consumed by such a receiver. Similarly, the amount of area required to implement such a receiver in an integrated circuit is advantageously reduced. In a further aspect of the present invention, a synchronization sequence uses less than the complete set of frequency bands (402-408) available for transmission of a UWB symbol.

11 Claims, 3 Drawing Sheets

SERIALIZATION OF MULTI-BAND SEQUENCE KEYING FOR ULTRA WIDEBAND RECEIVER ARCHITECTURE WITH REDUCED COMPLEXITY AND POWER CONSUMPTION

CROSS REFERENCE TO RELATED APPLICATION

This application claims the benefit of U.S. provisional application Ser. No. 60/549,850 filed Mar. 2, 2004, which is incorporated herein whole by reference.

The present invention relates generally to wireless communication, and more particularly relates to at least partial serialization of multi-band sequence keying in ultra wideband communications, and to ultra wideband receiver architectures having reduced complexity and reduced power consumption.

Ultra wideband (UWB) communications are a form of radio communication in which a signal is spread over a large portion of the radio spectrum, and in which the signal power at any particular frequency is therefore relatively small. The bandwidth of such systems is typically greater than 500 MHz, and in some UWB systems the bandwidth may be, for example, between 2 GHz and 100 GHz. Early UWB systems imparted information to their signals through the use of pulse position modulation. Such pulse position modulation is sometimes referred to in the context of UWB systems as time modulation.

By modulating either the pulse position, that is, the time at which a pulse occurs, or the phase of the pulse, information can be encoded into, and subsequently derived from, a UWB signal. For example, a slightly early pulse may be interpreted as a "zero", while a slightly delayed pulse may be interpreted as a "one". Alternatively, a pulse transmitted at zero phase may be interpreted as a "zero", while a pulse transmitted with 180 degrees may be interpreted as a "one". Unfortunately, these schemes only provide one bit of information per transmitted pulse.

One signalling scheme for increasing the information content of UWB signals involves augmenting the phase or pulse position bits with sequence keying. This technique is sometimes referred to as spectral keying. Sequence keying requires that the UWB waveform consist of independent transmissions in a number of pre-defined frequency bands. In this way, additional information is represented by the time order of the selection of frequency bands for the transmission of UWB pulses. As the number of frequency bands increases, the number of permutations for the time order sequence of frequencies increases rapidly. The use of multiple bands provides some distinct advantages for the implementation of a UWB system, since it allows a reduction in the circuit bandwidths and sample rates by a factor equal to the number of bands employed. Applying sequence keying to the resulting transmitter and receiver is a logical enhancement to increase the information density of such a multi-band UWB system. The apparent disadvantage is that a number of parallel receivers are needed in order to receive the transmitted sequence of tones without prior knowledge of that sequence.

What is needed are methods and apparatus for reducing the complexity and the power consumption of the multi-branch receivers that are required to receive and demodulate the ultra wideband signals transmitted which employ such sequence keying over two or more frequency bands.

Briefly, by partially serializing the transmission of a sequence keyed UWB symbols, the number of parallel receiver paths required to receive such a transmission is reduced. The reduced number of receiver paths are re-used during the reception of each of the partially serialized portions of a UWB symbol, and the local oscillator output frequencies are changed for reception of each of those portions. Reducing the number of parallel receiver paths advantageously reduces the amount of power consumed by such a receiver. Similarly, the amount of area required to implement such a receiver in an integrated circuit is advantageously reduced.

In a further aspect of the present invention, a synchronization sequence uses less than the complete set of frequency bands available for transmission of a UWB symbol.

Generally, the present invention relates to methods and apparatus for reducing the complexity and the power consumption of the multi-branch receivers that are required to receive and demodulate the ultra wideband signals transmitted with two or more frequency bands, i.e., sequence keyed UWB symbols. Similarly, the present invention relates to methods and apparatus for transmitting a partially serialized UWB symbol. Additionally the present invention relates to methods and apparatus for synchronizing a receiver with a transmitter.

A multi-band. UWB receiver for which the sequence of arrival times conveys all or part of the modulation information normally requires n parallel receiver branches, or receiver paths, for n bands, In embodiments of the present invention, a partial or full serialization of the transmitted sequence is used to reduce the number of parallel receiver branches by a factor between 2 and n. In other words, the number of portions into which the sequence keyed UWB symbol may be serialized into may be two or greater. This is done without altering the properties of a sequence keying sequence.

Reference herein to "one embodiment", "an embodiment", or similar formulations, means that a particular feature, structure, operation, or characteristic described in connection with the embodiment, is included in at least one embodiment of the present invention. Thus, the appearances of such phrases or formulations herein are not necessarily all referring to the same embodiment. Furthermore, various particular features, structures, operations, or characteristics may be combined in any suitable manner in one or more embodiments.

One modulation scheme for UWB communication is sometimes referred to as spectral keying, which in addition to modulating transmitted pulses in accordance with, for example, BPSK or QPSK modulation techniques, also uses the sequence of transmission of pulses at different frequencies to convey modulation information. For example, five different frequencies may be chosen at a spacing of, for example, 800 MHz, In this example, the pulse duration at each frequency is 3 ns per pulse and therefore 15 ns is required to send the complete sequence. Since, from the perspective of the receiver, the transmitted sequence is unknown ahead of time, parallel receiver paths, or branches, are implemented to allow for any order of arrival.

When considering an implementation of a UWB transceiver in the form of an integrated circuit, one disadvantage of sequence keying is the relatively large analog RF section that results from the need for parallel receiver paths. In particular there are a large number of analog-to-digital (A/D) converters required for implementation of the parallel receiver paths, which, in turn, requires a significant amount of chip area, and, in operation, requires a significant amount of power.

Figure 1:
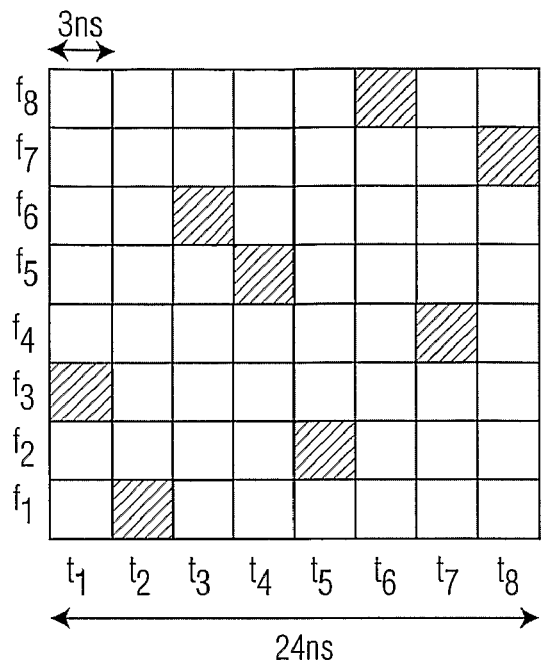
FIG. 1 is a frequency versus time diagram illustrating one scheme for transmission of symbols in a known ultra wideband communication system.

Referring to FIG. 1, a frequency versus time diagram illustrating a sequence keying scheme for transmission of symbols in an ultra wideband communication system is shown. More particularly, FIG. 1 illustrates an example in which a UWB symbol is transmitted, the UWB symbol having eight frequency bands and eight modulation time slots. In this illustrative example, only one carrier (i.e., f1, f2, f3, f4, f5, f6, f7, or f8) can be turned on to transmit during each time slot. Once a carrier has be turned on, it is not turned on again during the transmission of that UWB symbol. As illustrated in FIG. 1, the UWB symbol consists of frequency band f3 at time t1, frequency band f1 at time t2, frequency band f6 at time t3, frequency band f5 at time t4, frequency band f2 at time t5, frequency band f8 at time t6, frequency band f4 at time t7, and frequency band f7 at time t8. This can be expressed in a convenient notation as f3@t1, f1@t2, f6@t3 and so on. A further notational simplification is to express the selected frequencies during the eight slots as {3, 1, 6, 5, 2, 8, 4, 7}, where it is understood that the numbers represent which one of the eight carriers is turned on respectively at times t1, t2, t3, ... t8.

In accordance with the present invention, partial serialization of the transmitted UWB signal, results in a reduction in the number of parallel receivers paths required. Consequently, savings in both chip area and power consumption are achieved.

In one scheme for reducing the number of parallel receiver paths in a receiver for a sequence keyed UWB symbol, the sequence is fully serialized by providing individual time slots for each frequency. In general, this requires that $n^2$ time slots be made available, each of 3 ns in this case. So for n=5, 75 ns is needed between successive symbols. Attempts to increase the pulse repetition rate beyond 13.3 MHz would not be viable without reducing the pulse width, However, reducing the pulse width has several disadvantages, including the fact that the bandwidth occupied by each sub-band would increase, and the number of RAKE fingers needed to collect a substantial portion of the signal energy would also increase.

Embodiments of the present invention represent a compromise between a fully serial and a fully parallel transmission of sequence keying such that the receiver complexity can be cut by a factor of two while still supporting higher pulse repetition factors. Consider, for example, a requirement to use eight sub-carriers with a 3 ns pulse duration and at a symbol repetition rate of 19.5 MHz, For complete serialization, we would need 64 times 3, or 192 ns between each symbol. However, in a UWB receiver in accordance with the present invention, the available time is 51 ns (1/19.5 MHz), Consider that we have time for up to two sets of eight pulses (2*8*3=48 ns), In accordance with the present invention, the number of parallel receiver branches can be reduced by a factor of 2, while maintaining the original properties of the sequence keying modulation scheme, including information throughput. More particularly, in this case we have 16 phase bits (2 per carrier) and 15 sequence bits since $\log_2(8!)=15.2$, giving a total of 31 bits per symbol. This gives a raw data rate of 31*19.5=604.5 Mbps.

Figure 2:
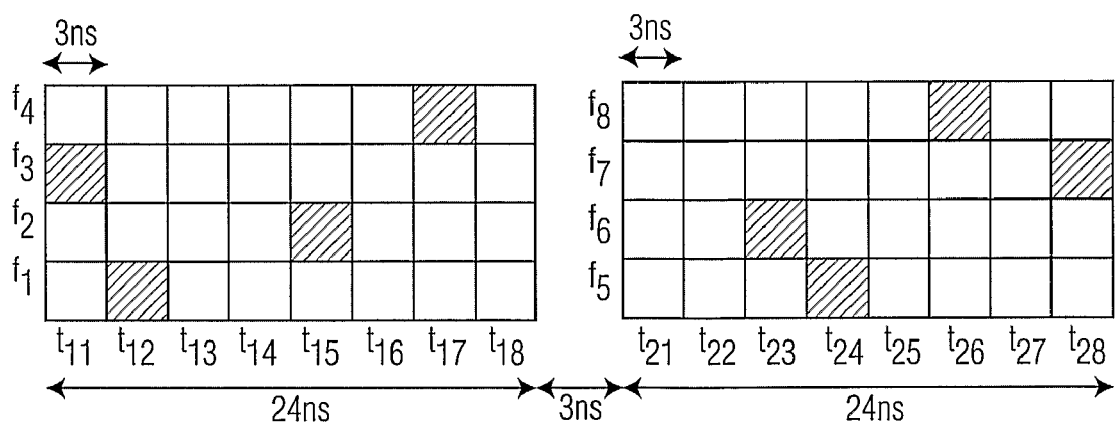
FIG. 2 is a frequency versus time diagram illustrating a partial serialization scheme for transmission of symbols in an ultra wideband communication system in accordance with the present invention.

Referring to FIG. 2, a frequency versus time diagram illustrating a scheme for transmission of UWB symbols in accordance with the present invention is shown. More particularly, FIG. 2 illustrates an example in which the sequence keyed UWB symbol of FIG. 1 has been reformatted in accordance with the invention. As shown in FIG. 2, the UWB symbol consists of a first portion consisting of frequency band f3 at time t11, frequency band f1 at time t12, no frequency band at time t13, no frequency band at time t14, frequency band f2 at time t15, no frequency band at time t16, frequency band f4 at time t17, and no frequency band at time t18; an inter-portion gap (3 ns in this illustrative example); and a second portion of the UWB symbol consisting of no frequency band at time t21, no frequency band at time t22, frequency band f6 at time t23, frequency band f5 at time t24, no frequency band at time t25, frequency band f8 at time t26, no frequency band at time t27, and frequency band f7 at time t28. This can be expressed in a convenient notation as f3@t11, f1@t12, 0@t13, and so on, where "0" represents no transmission in that time slot. A further notational simplification is to express the selected frequencies during the eight time slots of portions 1 and 2, as P1 {3, 1, 0, 0, 2, 0, 4, 0}, P2{0, 0, 6, 5, 0, 8, 0, 7} where it is understood that the numbers represent which one of the eight carriers is turned on respectively at times t11, t12, t13, ... t18 for the first portion (P1) and times t21, t22, t23, ... t28 for the second portion (P2).

With reference to FIGS. 1 and 2, it can be seen that all of the temporal ordering of the spectral components shown in the UWB symbol of FIG. 1, can be obtained from the partially serialized UWB symbol of FIG. 2. It will be appreciated by those skilled in the art and having the benefit of this disclosure that the partially serialized sequence keyed UWB symbol of FIG. 2 requires only half the number of parallel receiver branches as compared to a receiver for the sequence keyed UWB symbol shown in FIG. 1.

In one embodiment of the present invention, a receiver, for receiving a UWB symbol having eight spectrally different components, includes four parallel branches. Each complex local oscillator is capable of switching between two available frequencies. During the first half of the symbol interval, frequencies f1, f2, f3, and f4 are provided, whereas during the second half, these are switched over to provide frequencies f5, f6, f7, and f8. Memories are used to store the samples from the first and second halves to allow maximum likelihood decoding of the sequence keying code words. Optional RAKE combining of the significant multipaths is available by making use of additional samples collected by the analog-to-digital converters (ADCs) before switching to the second set of frequencies.

Figure 3:
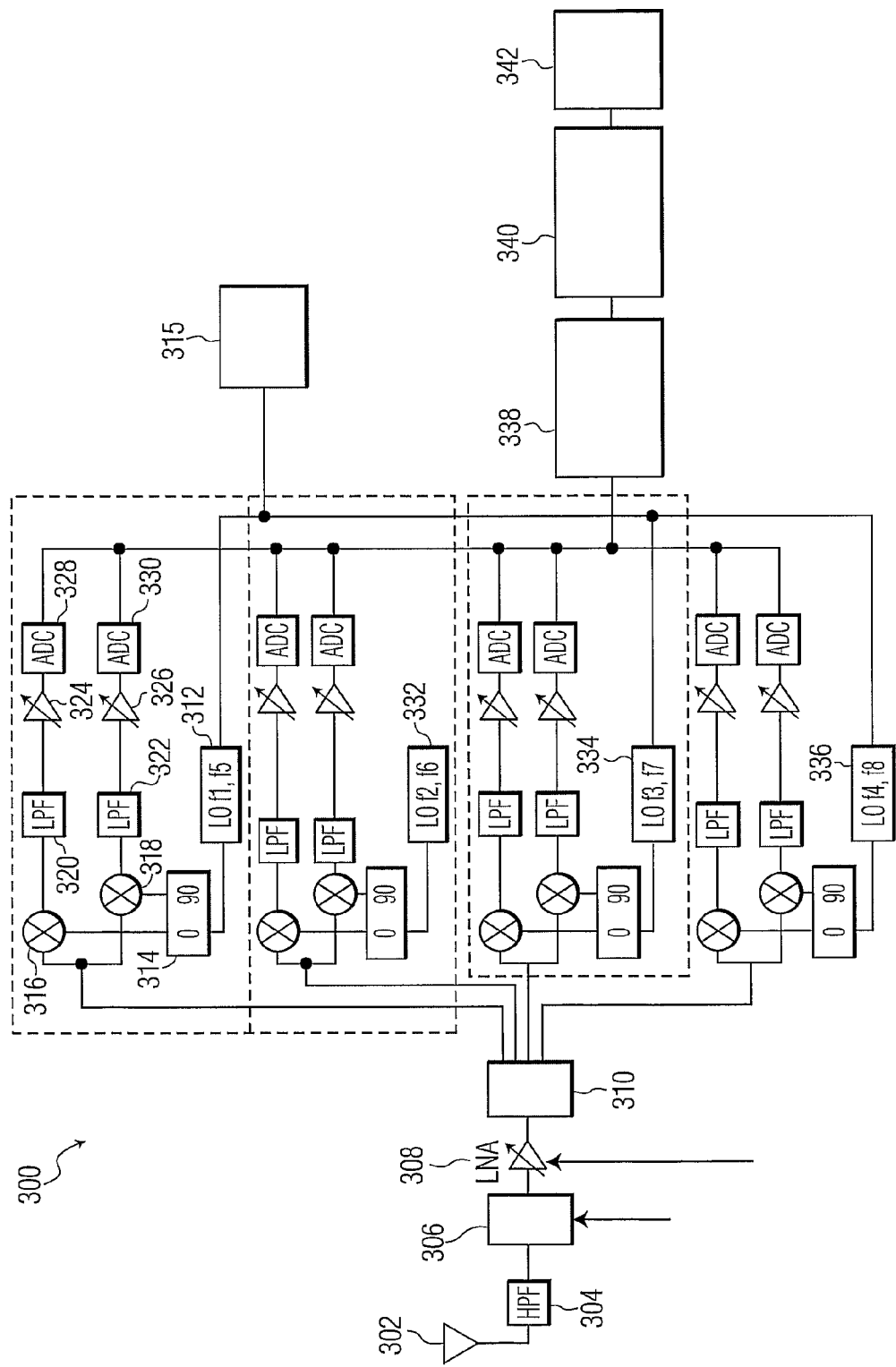
FIG. 3 is an architectural block diagram of a simplified UWB receiver in accordance with the present invention.

An illustrative embodiment of the present invention is shown in the block diagram of FIG. 3. This embodiment includes a typical radio receiver front end (antenna, filter, and low-noise amplifier), and further shows the output of the low-noise amplifier split and coupled to each of four parallel receiver paths in accordance with the present invention. Further in accordance with the present invention, each of the four parallel receiver paths includes a local oscillator that is operable to produce two different mixing frequencies. In this way, each of the four receiver paths can be used to receive two different frequency bands.

More particularly, a receiver portion 300 of a transceiver includes an antenna 302 that is coupled to a high pass filter 304. High pass filter 304 is coupled to provide a signal to antenna switch 306, antenna switch 306 shown as receiving a control signal from the transmitter portion of the transceiver. Antenna switch 306 is coupled to provide a signal to variable-gain low-noise amplifier (LNA) 308. The output of LNA 308 is coupled to power divider 310. Power divider 308 provides a signal to each of four parallel receiver paths.

A first receiver branch, or path, includes a local oscillator 312. Local oscillator 312 is operable to provide, in response to a control signal from local oscillator control circuit 315, either a first frequency or a second frequency. Local oscillator control circuit 315 can be implemented in a variety of ways, but is basically a timing circuit that recognizes that a synchronization sequence has been received, and thereafter is operable to provide the control information necessary for the local oscillator in each receiver branch to provide either the first or second frequency at the correct time periods to receive the various portions of the transmitted partially serialized sequence keyed UWB symbol. The output of local oscillator 312 is coupled to a block for producing an in-phase (I) and quadrature (Q) version of the signal. The in-phase signal is coupled to a mixer 316 and the quadrature signal is coupled to a mixer 318. Each of mixers 316, 318 receive a signal from power divider 310. The outputs of mixers 316, 318 are coupled, respectively, to low pass filters 320, 322. The outputs of low pass filters 320, 322 are coupled, respectively, to variable gain amplifiers 324, 326. The outputs of variable gain amplifiers 324, 326 are coupled, respectively, to A/D converters 328, 330. The outputs of A/D converters 328, 330 are coupled to RAKE combiner 338. The second, third, and fourth receiver branches are constructed similarly to the arrangement of the first receiver path, with the exception that the local oscillator of each path produces a different pair of frequencies for their respective mixers, and each of those local oscillators is coupled to receive control information from local oscillator control circuit 315.

Still referring to FIG. 3, the output of RAKE combiner 338 is coupled to a sequence keying demodulator 340; and the output of sequence keying demodulator 340 is coupled to sequence keying decoder 342.

Those skilled in the art and having the benefit of this disclosure will understand that such a local oscillator may be designed in a variety of ways that are consistent with the present invention. For example, such a local oscillator may produce one of two frequency outputs responsive to a control signal. This approach has the advantage of using relatively little power, but has the disadvantage of requiring time to switch its frequency output. Alternatively, such a local oscillator may produce two frequency outputs simultaneously and a multiplexer, responsive to a control signal, selects the appropriate frequency output at any given time. This approach has the advantage of requiring very little time to switch between frequencies, but has the disadvantage of consuming additional power to have each frequency output ready concurrently.

Figure 4:
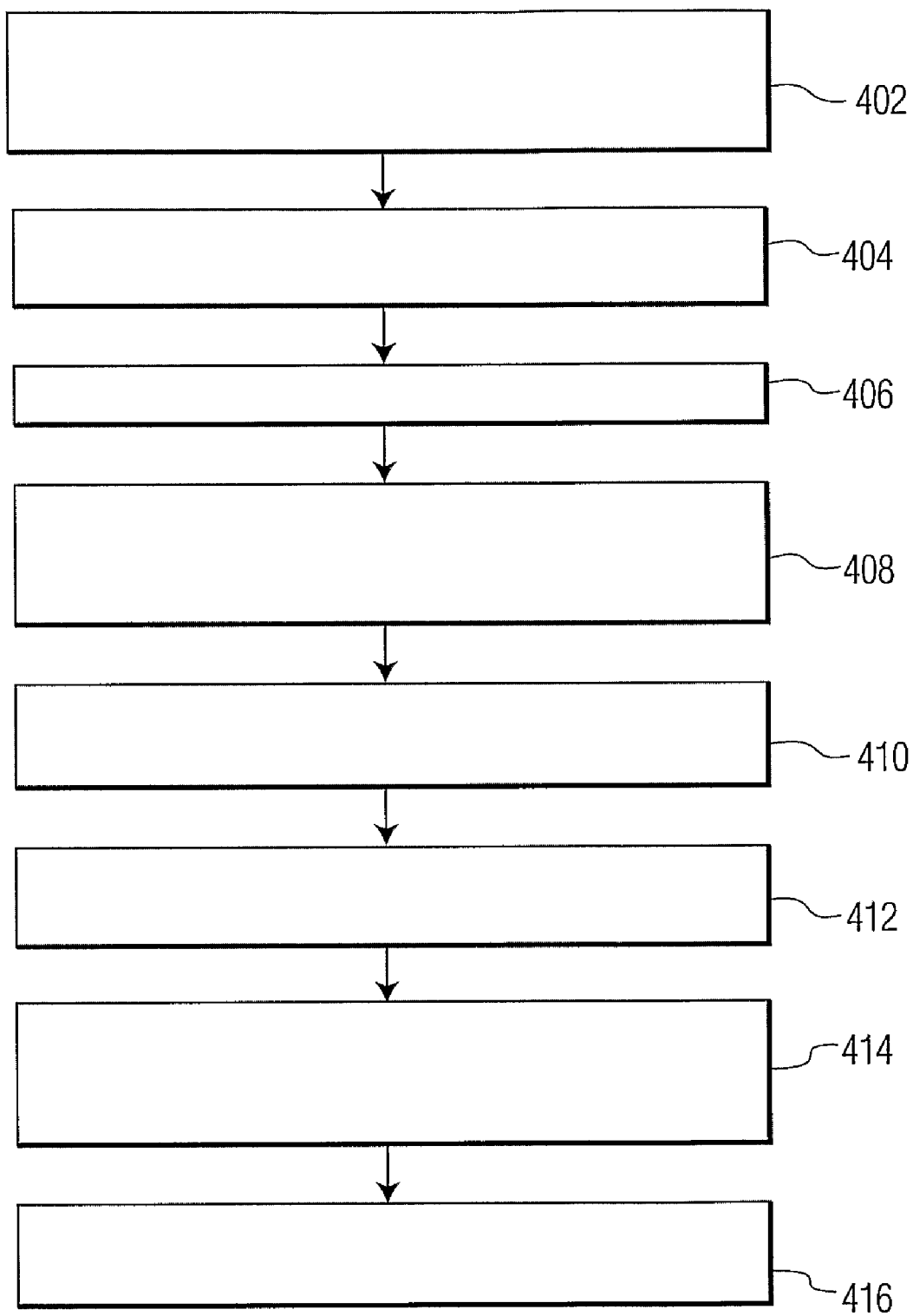
FIG. 4 is a flow diagram illustrating an illustrative method in accordance with the present invention.

Referring to FIG. 4, one embodiment of the present invention is described in which a receiver is operated so as to synchronize to a UWB signal, and then to receive a first portion and a second portion of partially serialized ultra wideband USB symbol. More particularly, an illustrative method of synchronizing to an ultra wideband signal and receiving a partially serialized, sequence keyed, ultra wideband symbol, includes operating 402 a first plurality of oscillators, each one of the first plurality of oscillators selectively coupled to a respective one of a plurality of parallel receiver paths. As described above the complex local oscillator used in each of the parallel receiver paths may be implemented as, for example, a pair of oscillators and a multiplexer that is used to select between the frequency outputs of each oscillator. Maintaining 404 a second plurality of oscillators in a non-operational low-power state. This helps to reduce power consumption during the period in which the receiver is waiting to determine that a synchronization sequence has been detected. Since the synchronization sequence may be designed with a known sequence of frequency bands that is a subset of the complete set of frequency bands available for transmission of a UWB symbol, only a subset of the local oscillators need to be powered, or operated, at any time while searching for the synchronization sequence. Operating 406 the plurality of parallel receiver paths. In this way the a synchronization sequence may be detected. Determining 408, based at least in part upon an output of each of the plurality of parallel receiver paths, whether a synchronization sequence has been received. That is, if the predetermined sequence has been received then the receiver is synchronized to the transmitter, and the receiver is not ready to receive the partially serialized sequence keyed UWB symbol. Receiving 410 a first portion of a partially serialized, sequence keyed, ultra wideband symbol. Operating 412, if the synchronization sequence has been detected, a second plurality of oscillators, and selectively coupling 414 each one of the second plurality of oscillators to a respective one of the plurality of parallel receiver paths. In this way, the local oscillators will be able to provide the mixers in each of the receiver paths with new frequencies that enable the reception of a subsequent portion of the partially serialized sequence keyed ultra wideband symbol. Receiving 416 a second portion of the partially serialized, sequence keyed, ultra wideband symbol.

In typical embodiments of the present invention, the frequency carriers are turned on at the beginning of a modulation time slot and turned off at the end of that modulation time slot. However, in alternative embodiments of the present invention, identical temporal alignment of frequency carrier operation and modulation time slot boundaries may not be required, but rather some accommodation is provided for recognizing a symbol wherein there is some misalignment between the time of frequency carrier operation and the modulation time slot boundaries.

Various embodiments of the present invention include methods and apparatus for achieving enhanced sequence keying by reducing the number of parallel receiver branches by a factor at least two, while maintaining the original properties of the sequence keying modulation. The present invention utilizes a compromise between a fully parallel and a fully serial approach. In other words, a first set of bits is transmitted in using a first set of carriers, and this first transmission is then serially followed by transmission of a second set of bits using a second set of carriers.

In various alternative embodiments, a receiver for receiving partially serialized, sequence keyed UWB symbols in accordance with the present invention, may be combined with a transmitter so as to form a transceiver. In such arrangements, an antenna may be shared between the transmitter and the receiver. In some transceiver embodiments, the transmitter and receiver circuits may be incorporated in a single integrated circuit.

An advantage of some embodiments of the present invention, is that since only one set of carriers is active at a time, the complexity of the receiver can be significantly reduced.

An advantage of some embodiments of the present invention, is that by reducing the number of parallel receiver branches required, the area of a chip in which such a receiver is implemented is also reduced.

An advantage of some embodiments of the present invention, is that by reducing the amount of circuitry required to implement a receiver, the amount of power consumption is reduced.

It is to be understood that the present invention is not limited to the embodiments described above, but encompasses any and all embodiments within the scope of the subjoined Claims.

What is claimed is:

1. A method of synchronizing to an ultra wideband signal and receiving a partially serialized, sequence keyed, ultra wideband symbol, comprising: a) operating a first plurality of oscillators, each one of the first plurality of oscillators selectively coupled to a respective one of a plurality of parallel receiver paths; b) maintaining a second plurality of oscillators in a non-operational low-power state; c) operating the plurality of parallel receiver paths; d) determining based at least in part upon an output of each of the plurality of parallel receiver paths, whether a synchronization sequence has been received; e) receiving a first portion of a partially serialized, sequence keyed, ultra wideband symbol; f) operating if the determination of d) is affirmative, a second plurality of oscillators; g) selectively coupling each one of the second plurality of oscillators to a respective one of the plurality of parallel receiver paths; and h) receiving a second portion of the partially serialized, sequence keyed, ultra wideband symbol, wherein each of the plurality of receiver paths receives an in-phase and quadrature version of the outputs of the oscillators coupled thereto, the method further comprising decoupling the first plurality of oscillators from the plurality of parallel receiver paths subsequent to receiving the first portion of a partially serialized, sequence keyed, ultra wideband symbol.

2. The method of claim 1, wherein the non-operational low-power state comprises a de-energized state.

3. The method of claim 1, wherein the non-operational low-power state comprises an energized, non-switching state.

4. A method of receiving a partially serialized, sequence keyed, ultra wideband symbol, comprising: a) operating a plurality of local oscillators, each local oscillator operable to selectively produce at least two frequency outputs, and further configured to produce an in-phase and a quadrature version of each of the at least two frequency outputs; b) operating the plurality of parallel receiver paths, each one of the plurality of parallel receiver paths coupled to a respective one of the local oscillators and receiving a first in-phase and quadrature pair of signals at a first one of the at least two frequencies; c) receiving a first portion of a partially serialized, sequence keyed, ultra wideband symbol; d) operating the plurality of local oscillators such that each one of the plurality of parallel receiver paths receives, from its corresponding local oscillator, a second in-phase and quadrature pair of signals at a second one of the at least two frequencies; and g) receiving a second portion of the partially serialized, sequence keyed, ultra wideband symbol, wherein there is time delay between the end of the first portions of the partially serialized, sequence keyed, ultra wideband symbol and the second portion of the partially serialized, sequence keyed, ultra wideband symbol.

5. The method of claim 4, further comprising synchronizing to an ultra wideband signal prior to receiving the first portion of the partially serialized, sequence keyed, ultra wideband symbol.

6. The method of claim 5, wherein the local oscillators are operable to selectively produce at least two frequency outputs subsequent to synchronizing to an ultra wideband signal.

7. The method of claim 6, wherein the local oscillators are operable to selectively produce only one frequency output prior to synchronizing to an ultra wideband signal.

8. A receiver for receiving a partially serialized, sequence keyed, ultra wideband symbol, comprising: a plurality of parallel receiver paths, each receiver path including a first mixer and a second mixer a plurality of complex local oscillators each complex local oscillator having an in-phase output and a quadrature output, each one of the complex local oscillators coupled to a corresponding one of the plurality of receiver paths such that the in-phase output is coupled to the corresponding first mixer and the quadrature output is coupled to the corresponding second mixer a rake combiner coupled to receive an output from each of the plurality of parallel receiver paths; a sequence keying demodulator coupled to the rake combiner; and a sequence keying decoder coupled to the sequence keying demodulator, wherein each receiver path further comprises a pair of analog-to-digital converters, the receiver further comprising a memory coupled to store information received from the first portion of the partially serialized, sequence keyed, ultra wideband symbol.

9. The receiver of claim 8, further comprising control circuitry for determining whether a synchronization sequence has been received and for providing control signals that determine the frequency output of each of the plurality of complex local oscillators.

10. The receiver of claim 9, further comprising an antenna (302), a filter coupled to the antenna, an antenna switch coupled to the filter, a variable-gain low-noise amplifier coupled to the antenna switch, and a power divider coupled to the variable-gain low-noise amplifier, the power divider further coupled to each of the plurality of parallel receiver paths.

11. A transceiver, comprising: a receiver for receiving a partially serialized, sequence keyed, ultra wideband symbol, comprising: a plurality of parallel receiver paths, each receiver path including a first mixer and a second mixer, a plurality of complex local oscillators each complex local oscillator having an in-phase output and a quadrature output, each one of the complex local oscillators coupled to a corresponding one of the plurality of receiver paths such that the in-phase output is coupled to the corresponding first mixer and the quadrature output is coupled to the corresponding second mixer a rake combiner coupled to receive an output from each of the plurality of parallel receiver paths; a sequence keying demodulator coupled to the rake combiner; a sequence keying decoder coupled to the sequence keying demodulator; a memory coupled to store information received from the first portion of the partially serialized, sequence keyed, ultra wideband symbol; control circuitry for determining whether a synchronization sequence has been received and for providing control signals that determine the frequency output of each of the plurality of complex local oscillators; and an antenna a filter coupled to the antenna, an antenna switch coupled to the filter, a variable-gain low-noise amplifier coupled to the antenna switch, and a power divider coupled to the variable-gain low-noise amplifier, the power divider further coupled to each of the plurality of parallel receiver paths; and a transmitter coupled to the antenna switch.

* * * * *